United States Patent
Pao et al.

(10) Patent No.: US 10,182,383 B2
(45) Date of Patent: *Jan. 15, 2019

(54) METHOD OF HANDLING CELL RESELECTION

(71) Applicant: ACER INCORPORATED, New Taipei (TW)

(72) Inventors: Wei-Chen Pao, New Taipei (TW); Jung-Mao Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,476

(22) Filed: Jan. 10, 2018

(65) Prior Publication Data

US 2018/0132155 A1   May 10, 2018

Related U.S. Application Data

(63) Continuation of application No. 14/931,811, filed on Nov. 3, 2015, now Pat. No. 9,907,003.

(Continued)

(51) Int. Cl.
*H04W 36/22* (2009.01)
*H04W 28/08* (2009.01)
(Continued)

(52) U.S. Cl.
CPC ............ *H04W 36/22* (2013.01); *H04W 28/08* (2013.01); *H04W 36/0088* (2013.01);
(Continued)

(58) Field of Classification Search
CPC ............. H04W 36/08; H04W 36/0088; H04W 36/0061; H04W 36/14; H04W 36/22;
(Continued)

(56) References Cited

U.S. PATENT DOCUMENTS

| 9,907,003 B2 * | 2/2018 | Pao ............... H04W 36/22 |
|---|---|---|
| 2008/0227453 A1 | 9/2008 | Somasundaram |

(Continued)

FOREIGN PATENT DOCUMENTS

| CN | 101478744 A | 7/2009 |
|---|---|---|
| CN | 101637048 A | 1/2010 |

(Continued)

OTHER PUBLICATIONS

3GPP TSG-RAN WG2 #91 R2-153406, Aug. 24, 2015.

(Continued)

*Primary Examiner* — Magdi Elhag
(74) *Attorney, Agent, or Firm* — Winston Hsu

(57) ABSTRACT

A method of handling cell reselection includes: receiving a first cell reselection information message from a cell of the communication system, wherein the first cell reselection information message includes at least one cell reselection threshold; generating a rule ranking list, including: selecting a best cell according to a given criteria for each frequency, and storing the best cell into the rule ranking list if the best cell is corresponding with at least one cell reselection threshold; and selecting one of the best cells for cell reselection according to the rule ranking list, including: calculating a plurality of intervals each corresponding to one of the best cells within the rule ranking list according to the cell reselection threshold, generating a cell reselection value, and determining which of the plurality of intervals the cell reselection value is bounded in in order to determine which one of the best cells for cell reselection.

4 Claims, 11 Drawing Sheets

Related U.S. Application Data

(60) Provisional application No. 62/075,194, filed on Nov. 4, 2014.

(51) Int. Cl.
  *H04W 36/30* (2009.01)
  *H04W 36/00* (2009.01)
  *H04W 36/24* (2009.01)
  *H04W 48/20* (2009.01)
  *H04W 48/06* (2009.01)
  *H04W 48/12* (2009.01)

(52) U.S. Cl.
  CPC ........... *H04W 36/24* (2013.01); *H04W 36/30* (2013.01); *H04W 48/20* (2013.01); *H04W 48/06* (2013.01); *H04W 48/12* (2013.01)

(58) Field of Classification Search
  CPC ... H04W 36/24; H04W 36/165; H04W 36/30; H04W 36/04; H04W 28/08; H04W 48/18; H04W 88/06; H04W 24/02; H04W 76/046; H04W 72/085; H04W 72/0406
  See application file for complete search history.

(56) References Cited

U.S. PATENT DOCUMENTS

| | | |
|---|---|---|
| 2009/0047954 A1 | 2/2009 | Tenny |
| 2010/0093356 A1 | 4/2010 | Lee |
| 2010/0273485 A1 | 10/2010 | Huang |
| 2012/0082051 A1 | 4/2012 | Kim |
| 2012/0322447 A1 | 12/2012 | Ramachandran |
| 2013/0303173 A1 | 11/2013 | Hole |
| 2014/0179320 A1 | 6/2014 | Jang |
| 2014/0228032 A1 | 8/2014 | Jung |
| 2015/0131613 A1 | 5/2015 | Jung |
| 2015/0223258 A1 | 8/2015 | Jung |
| 2015/0319661 A1 | 11/2015 | Jung |
| 2016/0127969 A1 | 5/2016 | Pao |
| 2016/0127970 A1 | 5/2016 | Chuang |
| 2016/0255563 A1 | 9/2016 | Callender |

FOREIGN PATENT DOCUMENTS

| | | |
|---|---|---|
| EP | 1 626 605 A1 | 2/2006 |
| EP | 2 111 074 A1 | 10/2009 |
| WO | 2008112255 A2 | 9/2008 |
| WO | 2009057960 A2 | 5/2009 |

OTHER PUBLICATIONS

3GPP TS 36.304 V12.2.0 (Sep. 2014), Technical Specification, 3rd Generation Partnership Project; Technical Specification Group Radio Access Network; Evolved Universal Terrestrial Radio Access (E-UTRA); User Equipment (UE) procedures in idle mode (Release 12), XP050925613, pp. 1-37.

* cited by examiner

METHOD OF HANDLING CELL RESELECTION

CROSS REFERENCE TO RELATED APPLICATIONS

This application is a continuation application of U.S. application Ser. No. 14/931,811, filed on Nov. 3, 2015, which claims the benefit of U.S. Provisional Application No. 62/075,194, filed on Nov. 4, 2014. The contents of these applications are incorporated herein by reference in their entirety.

BACKGROUND OF THE INVENTION

1. Field of the Invention

The present invention is related to a method of handling cell reselection, and more particularly, to a method of handling cell reselection which ensures load balancing when communication devices in idle mode attempt to perform cell reselection.

2. Description of the Prior Art

The 3rd Generation Partnership Project (3GPP) has initiated the Long Term Evolution (LTE) program to bring novel network architecture and configuration, novel technology, and novel applications and services to provide reduced latency, improved spectral efficiency and faster user experiences with less cost.

Upon powered up or losing coverage, a communication device (i.e., a UE) of a communication system may search for suitable cells, such that the UE can receive communication services. If a suitable cell is found, the UE may registers with the cell when necessary. Furthermore, if the UE is in idle mode and not actively communicating with the cell, the UE may then camp on the cell and periodically search for better cells. When a better cell is found, the UE may select the better cell as a serving cell via a process commonly referred to as cell reselection. The searches performed in idle mode may allow the UE to camp on the best possible cell even if channel conditions change—for example, as the UE moves to a new location. In this way, the UE can reliably receive incoming paging messages and initiate or receive calls.

Basically, the UE selects a cell to camp on according to frequency priority as being in idle mode. Frequency priorities of different (inter) frequencies or inter radio access technology (inter-RAT) frequencies are determined according to CellReselectionPriority specified in 3rd Generation Partnership Project (3GPP) standard TS 36.331, which may be provided to the UE in a system information, in an RRCConnectionRelease message, or by inheriting from another RAT at inter-RAT cell (re) selection. And based on 3GPP standard TS 36.304, a frequency list or a cell list, which is associated with frequency priority, is configured at the time the UE goes to idle mode.

Therefore, existing cell reselection mechanisms may cause UEs in idle mode to concentrate on the cell with highest frequency priority, while it is beneficial if the UEs are distributed between the available frequencies in a way such that the capacity the communication system can offer is utilized in a good manner.

Obviously, there is a need for an improved method of handling cell reselection.

SUMMARY OF THE INVENTION

The present invention therefore provides a method of handling cell reselection to achieve load balancing when communication devices in idle mode attempt to perform cell reselection.

An embodiment of the present invention discloses a method of handling cell reselection, adapted to a communication device of a communication system. The method comprises receiving a first cell reselection information message from a cell of the communication system, wherein the first cell reselection information message comprises at least one cell reselection threshold; generating a rule ranking list, further comprising: selecting a best cell according to a given criteria for each frequency, and storing the best cell into the rule ranking list if the best cell is corresponding with at least one cell reselection threshold; and selecting one of the best cells for cell reselection according to the rule ranking list, further comprising: calculating a plurality of intervals each corresponding to one of the best cells within the rule ranking list according to the cell reselection threshold, generating a cell reselection value, and determining which of the plurality of intervals the cell reselection value is bounded in in order to determine which one of the best cells for cell reselection.

Another embodiment of the present invention discloses a communication device, which comprises a storage unit and a processing unit. The storage unit is configured to store a program code. The processing unit is configured to execute the program code, wherein a method of handling cell reselection compiled into the program code comprises: receiving a first cell reselection information message from a cell of the communication system, wherein the first cell reselection information message comprises at least one cell reselection threshold; generating a rule ranking list, further comprising: selecting a best cell according to a given criteria for each frequency, and storing the best cell into the rule ranking list if the best cell is corresponding with at least one cell reselection threshold; and selecting one of the best cells for cell reselection according to the rule ranking list, further comprising: calculating a plurality of intervals each corresponding to one of the best cells within the rule ranking list according to the cell reselection threshold, generating a cell reselection value, and determining which of the plurality of intervals the cell reselection value is bounded in in order to determine which one of the best cells for cell reselection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
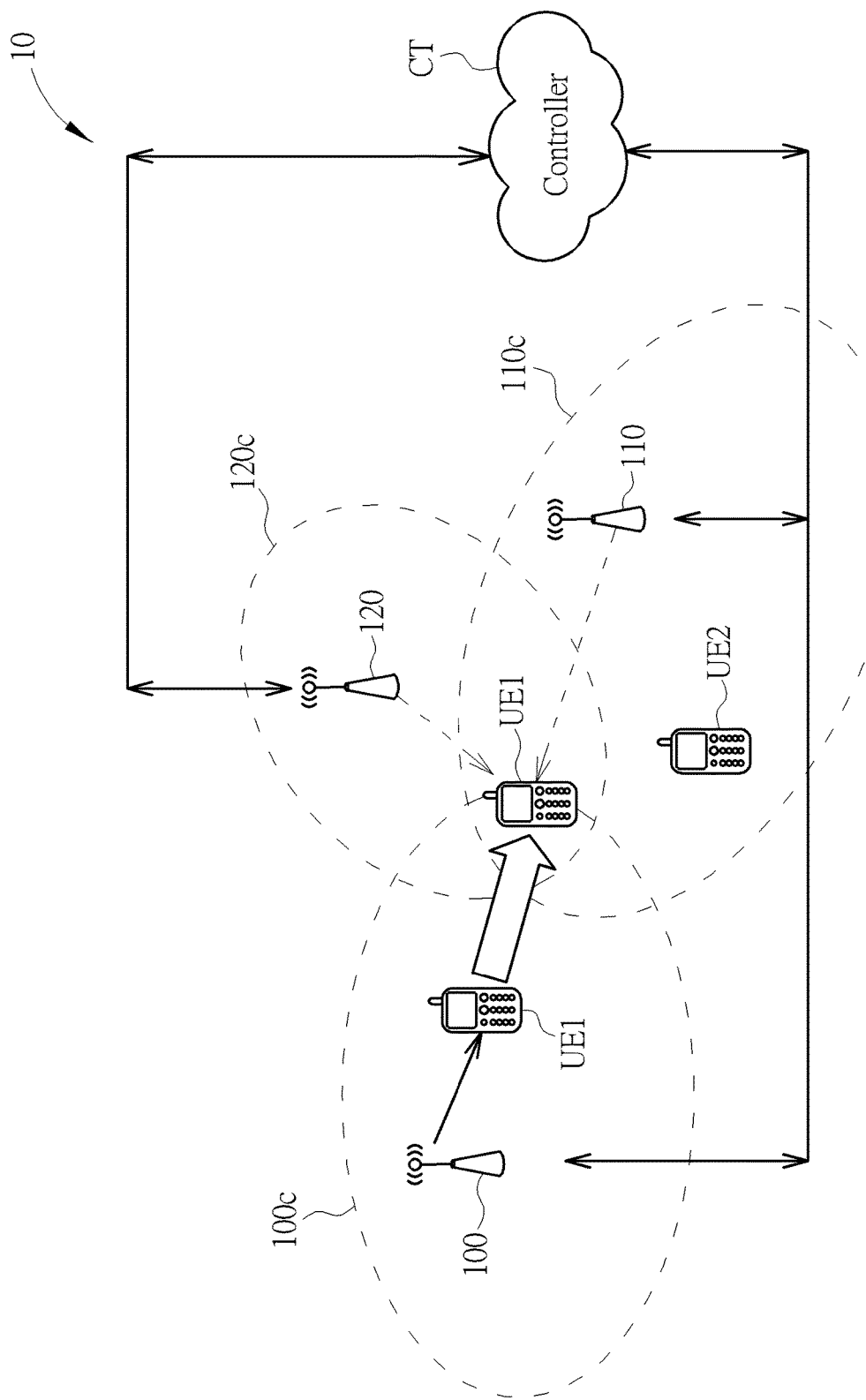
FIG. 1 is a schematic diagram illustrating a communication system according to an example of the present invention.

FIG. 1 is a schematic diagram illustrating a communication system 10 according to an example of the present invention. The communication system 10 is a cellular network wireless communication system, which briefly includes network nodes, communication devices UE1 and UE2. It is worth noting that the network nodes and/or the communication devices UE1 and UE2 in FIG. 1 are simply utilized for illustrating the structure of the wireless communication system 10. The network nodes may include base stations 100, 110, 120, a controller CT, a server (not shown), and a database (not shown). The base stations 100 to 120 may serve cells 100c, 110c, and 120c, respectively; however, the present invention is not limited thereto and a base station may provide services within a plurality of cells, and frequencies corresponding to the plurality of cells can be different. The base stations 100 to 120 constitute radio access networks. In an embodiment, the radio access networks can be a universal terrestrial radio access network (UTRAN) in a universal mobile telecommunications system (UMTS) respectively, and the base stations 100 to 120 correspond to Node-Bs (NBs). In another example, the radio access networks can be an evolved UTRAN (E-UTRAN) in a long term evolution (LTE) system, a LTE-Advanced (LTE-A) system or an evolution of the LTE-A system respectively, and the base stations 100 to 120 correspond to evolved NBs (eNBs). In another example, the radio access networks may be a radio access network conforming to wireless standards such as IEEE 802.11 and IEEE 802.16 respectively.

Furthermore, the controller CT, the server, and the database constitute a core network, and the core network may further include network entities such as a Mobility Management Entity (MME), a Serving Gateway (S-GW), a Packet Data Network (PDN) Gateway (P-GW), a Self-Organizing Networks (SON) server and/or a Radio Network Controller (RNC). In other words, after the network nodes receive information transmitted by the communication device UE1 or UE2, the information may be processed only by the radio access networks and decisions corresponding to the information are made at the radio access networks. Alternatively, the radio access networks may forward the information to the core network, and the decisions corresponding to the information are made at the core network after the core network processes the information. Besides, the information can be processed by both the radio access networks and the core network, and the decisions are made after coordination and/or cooperation are performed by the radio access networks and the core network. The communication devices UE1, UE2 can be a user equipment (UE), a machine type communication (MTC) device, a mobile phone, a laptop, a tablet computer, an electronic book or a portable computer system, respectively. Besides, the network nodes and the communication devices UE1, UE2 can be regarded as a transmitter or a receiver according to transmission, for example, for an uplink (UL), the communication devices UE1, UE2 are the transmitter and the network nodes are the receiver, and for a downlink (DL), the network nodes are the transmitter and the communication devices UE1, UE2 are the receiver.

Figure 2:
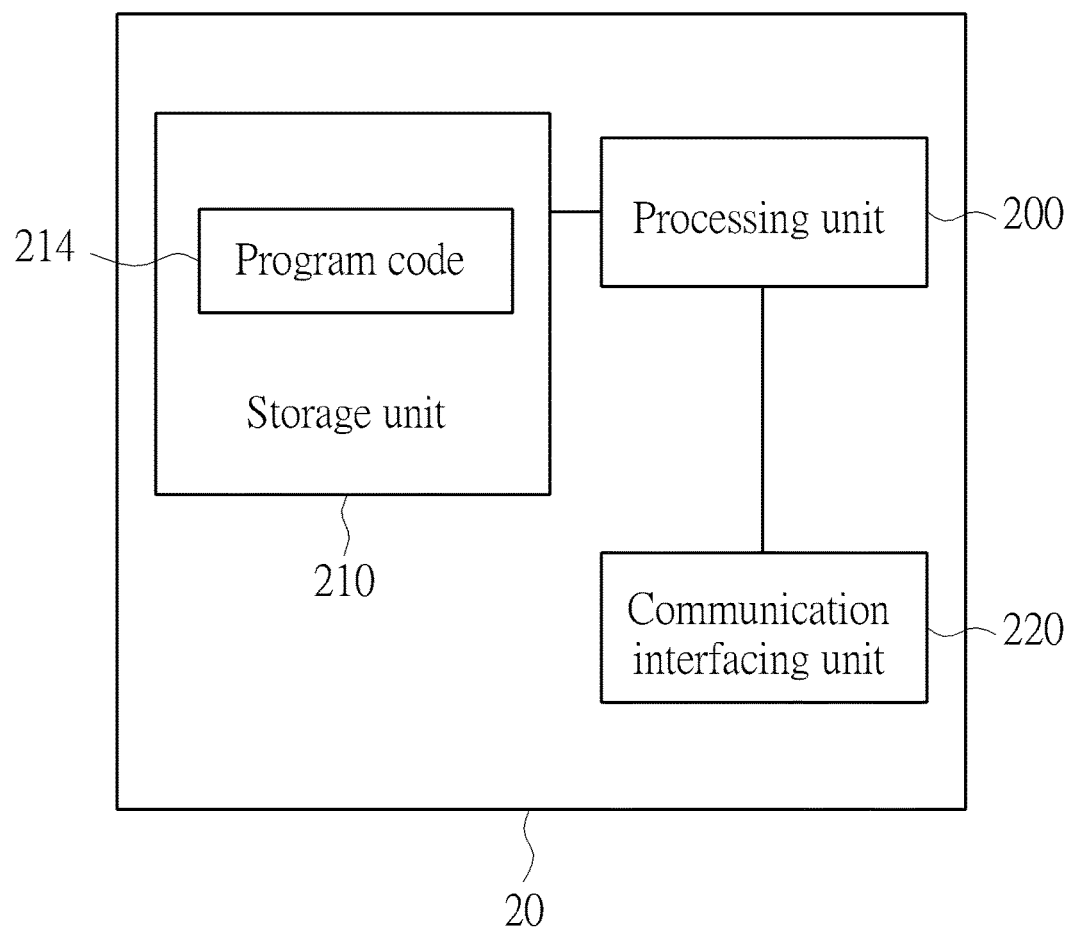
FIG. 2 is a schematic diagram illustrating a device according to an example of the present invention.

FIG. 2 is a schematic diagram illustrating a device 20 according to an example of the present invention. The device 20 can be the communication devices UE1, UE2 or the network nodes shown in FIG. 1, but is not limited herein. The device 20 may include a processing unit 200 such as a microprocessor or an Application Specific Integrated Circuit (ASIC), a storage unit 210 and a communication interface unit 220. The storage unit 210 may be any data storage device that can store a program code 214, accessed and executed by the processing unit 200. Examples of the storage unit 210 include but are not limited to a subscriber identity module (SIM), a read-only memory (ROM), a flash memory, a random-access memory (RAM), a CD-ROM/DVD-ROM, a magnetic tape, a hard disk and an optical data storage device. The communication interface unit 220 is preferably a transceiver and is used to transmit and receive signals (for example, messages or packets) according to processing results of the processing unit 200.

The basic condition for initiating a cell reselection is that the signal strength or signal quality from a candidate cell is better than the signal strength or signal quality from the current serving cell or cells of higher frequency priority. The signal strength or signal quality of signals received by the communication device UE1 shown in FIG. 1 may vary due to movement of the communication device UE1 or channel condition changes. Additionally, the communication device UE1 may perform cell reselection when cell reselection conditions are satisfied or if necessary (e.g., when frequency priority is changed via broadcasted information, or when the communication device is paged). A process can be utilized in the communication device UE1 to handle cell reselection. The process may be compiled into the program code 214 of the communication device UE1 and includes the following steps:

Step S02: Start.

Step S04: Receive a first cell reselection configuration message from the cell 100c of the communication system 10, wherein the first cell reselection configuration message includes at least one cell reselection rule.

Step S06: Check whether the at least one cell reselection rule is satisfied in order to generate a rule ranking list.

Step S08: Select one of the cells 110c and 120c to camp on according to the rule ranking list.

Step S10: End.

Figure 3:
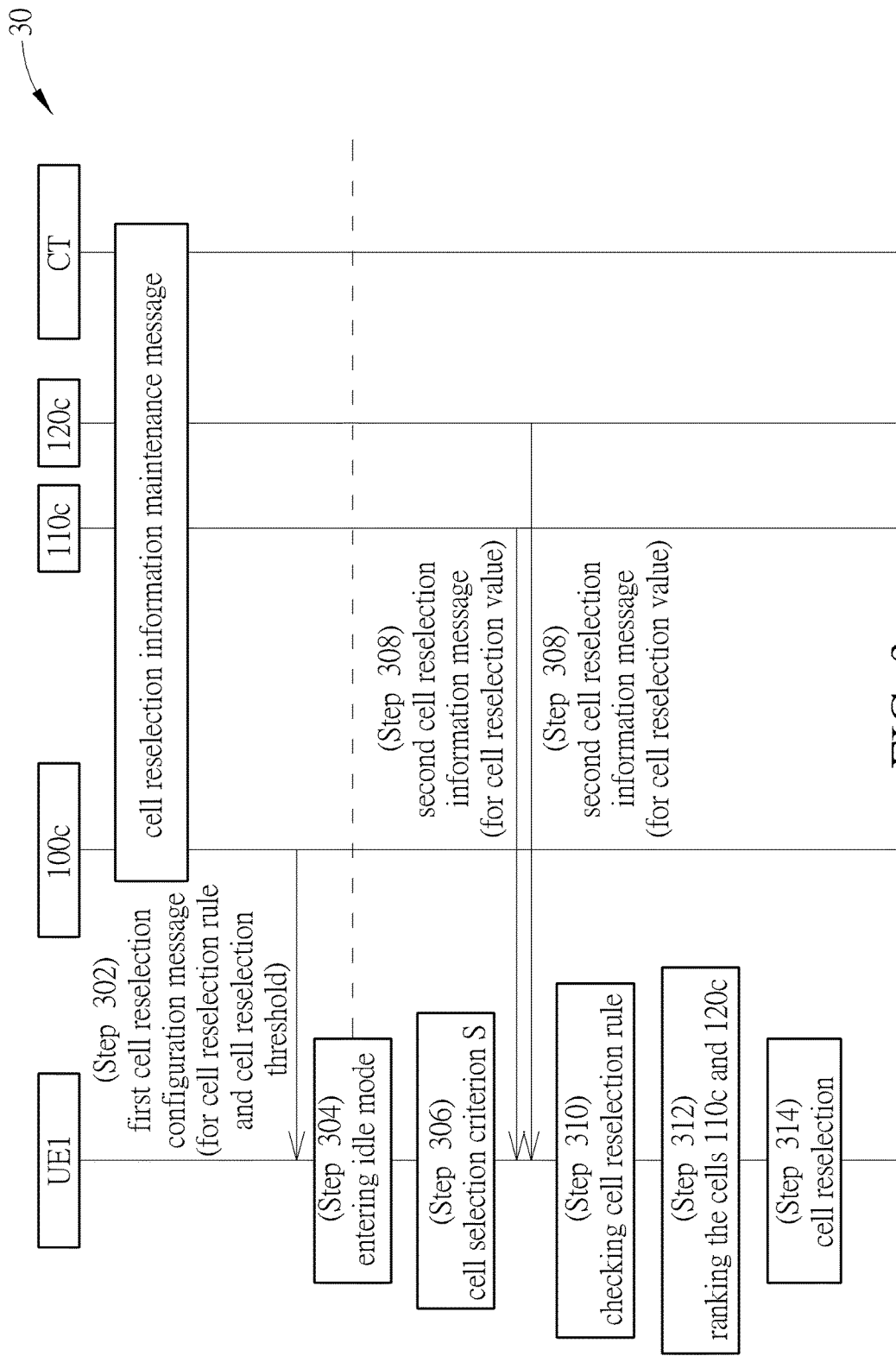
FIG. 3 to FIG. 11 are flowcharts illustrating different processes according to different embodiments of the present invention.

Specifically, FIG. 3 is a flowchart illustrating a process 30 according to an embodiment of the present invention. The process 30 can be utilized in the communication device UE1 shown in FIG. 1 to handle cell reselection. The process 30 may be compiled into the program code 214 of the communication device UE1 and includes the following steps:

Step 300: Start.

Step 302: Receive a first cell reselection configuration message from the cell 100c, wherein the first cell reselection configuration message includes at least one cell reselection rule and at least one cell reselection threshold, wherein a cell reselection information maintenance message is transmitted between the network nodes to update the at least one cell reselection rule, the at least one cell reselection threshold and at least one cell reselection value.

Step 304: Enter idle mode.

Step 306: Determines whether the cells 110c and 120c fulfill a cell selection criterion S when the communication device UE1 in idle mode attempts to perform cell reselection.

Step 308: Receive second cell reselection information messages broadcasted from the cells 110c and 120c, wherein each of the second cell reselection information messages includes the at least one cell reselection value.

Step 310: Check whether the at least one cell reselection rule is satisfied according to the second cell reselection information messages, wherein the communication device UE1 compares each of the at least one cell reselection value corresponding to one of the cells 110c and 120c with the at least one cell reselection threshold to determine which of the at least one cell reselection rule is satisfied.

Step 312: Rank the cells 110c and 120c according to the number of the at least one cell reselection rule satisfied in order to generate a rule ranking list.

Step 314: Select one of the cells 110c and 120c to camp on according to the rule ranking list, such that cell reselection (to the chosen cell with a highest rule priority in the rule ranking list) can be performed.

Step 316: End.

According to Step 302, the network nodes (i.e., the base stations 100 to 120 and the controller CT) interact with each other and exchange the at least one cell reselection rule, the at least one cell reselection threshold and the at least one cell reselection value via the cell reselection information maintenance message to determine or update the at least one cell reselection rule, the at least one cell reselection threshold and the at least one cell reselection value. Specifically, the controller CT may be an Operations, Administration, and Maintenance (OAM) server to maintain and update the at least one cell reselection rule, the at least one cell reselection threshold and the at least one cell reselection value according to, for example, cell loading information from the base stations 100 to 120, the occurrence of exceptional scenarios notified by the communication devices UE1 and UE2, or network configuration (e.g., dynamic adjustment according to the distribution of the communication devices UE1 and UE2). The at least one cell reselection rule includes at least one of a loading cell reselection rule (e.g., $Value_{Loading} < Threshold_{Loading}$), a capability cell reselection rule (e.g., $Value_{Capability} < Threshold_{Capability}$) a mobility cell reselection rule (e.g., $Value_{Mobility} < Threshold_{Mobility}$), a subscriber class cell reselection rule (e.g., $Value_{Subcriber\_Class} < Threshold_{Subcriber\_Class}$) a signal cell reselection rule (e.g., $Value_{Signal} < Threshold_{Signal}$) and a constant cell reselection rule (e.g., $Value_{Constant} < Threshold_{Constant}$). The at least one cell reselection threshold includes at least one of a loading cell reselection threshold (e.g., $Threshold_{Loading}$), a capability cell reselection threshold (e.g., $Threshold_{Capability}$), a mobility cell reselection threshold (e.g., $Threshold_{Mobility}$), a subscriber class cell reselection threshold (e.g., $Threshold_{Subcriber\_Class}$) a signal cell reselection threshold (e.g., $Threshold_{Signal}$) and a constant cell reselection threshold (e.g., $Threshold_{Constant}$). The at least one cell reselection value includes at least one of a loading cell reselection value (e.g., $Value_{Loading}$), a capability cell reselection value (e.g., $Value_{Capability}$), a mobility cell reselection value (e.g., $Value_{Mobility}$), a subscriber class cell reselection value (e.g., $Value_{Subcriber\_Class}$) a signal cell reselection value (e.g., $Value_{Signal}$) and a constant cell reselection value (e.g., $Value_{Constant}$).

Specifically, $Value_{Loading}$ is related to the corresponding base station (e.g., the base stations 100 to 120) or cell loading information, and can be presented as percentages or levels (e.g., low, medium, or high). $Value_{Loading}$ may be determined according to the number of communication devices in connected mode in the corresponding cell, radio resource utilization, backhaul rate, service (e.g., File Transfer Protocol (FTP) and Voice over IP (VoIP)), application (e.g., YouTube), or the density of communication devices in idle mode. The ratio of the number of active communication devices to the number of communication devices in idle mode may be a statistically stable value. Access load may be associated with the density of communication devices in idle mode. Therefore, the active traffic loading and the access loading may be related to the density of communication devices in idle mode. $Value_{Capability}$ is related to capability of the corresponding base station (e.g., the base stations 100 to 120)—for example, whether higher order modulation supporting (e.g., 256 Quadrature Amplitude Modulation (QAM)), Multi-input Multi-output (MIMO) supporting, Carrier Aggregation (CA) supporting, Coordinated Multi-Point (CoMP) supporting, Dual Connectivity supporting, or specific service supporting (e.g., Multimedia Broadcast/Multicast Service (MBMS)) is provided, or whether requirements on Grade of Service (GoS) and Quality of Service (QoS) are satisfied. $Value_{Mobility}$ is related to mobility information of a communication device (e.g., the communication devices UE1 and UE2), and can be presented as speed in kilometer per hour km/h or levels (e.g., low, medium, or high mobility state). $Value_{Subcriber\_Class}$ is related to subscriber class of a communication device (e.g., the communication devices UE1 and UE2), and can be presented as levels (e.g., Gold or Silver). $Value_{Signal}$ is related to signal strength or signal quality (e.g., RSRP or RSRQ) of the corresponding source cell (e.g., the cell 100c) or the corresponding target cell (e.g., the cells 110c and 120c) or an offset for measured signal strength or signal quality of the corresponding source or target cell. $Value_{Constant}$ can be presented as a number (e.g., any number between 0 and 1) or levels (e.g., level 0 to level 10), and may be generated randomly, or according to the cell loading status or communication device identifier (e.g., International Mobile Subscriber Identity (IMSI)).

For example, the base stations 100 to 120 and the controller CT determine that $Value_{Constant} < Threshold_{Constant}$, and that $Threshold_{Constant}$ and $Value_{Constant}$ can be any number between 0 and 1 in Step 302. The communication device UE1 camping on a serving cell (such as the cell 100c) may receive the first cell reselection configuration message from the cell 100c, and thus know that $Value_{Constant} < Threshold_{Constant}$, and that $Threshold_{Constant}$ is configured as, for example, 0.65 in Step 302. Later, the communication device UE1 may enter idle mode in Step 304. The communication device UE1 may attempt to perform cell reselection when it moves or satisfies certain cell reselection conditions or if necessary. Aiming to perform cell reselection, the communication device UE1 determines whether its neighbor cells (i.e., the cells 110c and 120c) fulfill the cell selection criterion S, which is specified in 3GPP standard TS 36.304, in Step 306—in other words, the communication device UE1 may perform measurements of the signal strength (e.g., RSRP) and the signal quality (e.g., RSRQ), for example. The communication device UE1 finds the cells 110c and 120c fulfill the cell selection criterion S, and receives the second cell reselection information messages broadcasted from the cells 110c and 120c, respectively in Step 308. According to the second cell reselection information message broadcasted from the cell 110c, $Value_{Constant}$ is configured as, for example, 0.5. According to the second cell reselection information message broadcasted from the cell 120c, $Value_{Constant}$ is configured as, for example, 0.8. After comparing $Value_{Constant}$ corresponding to the cell 110c with $Threshold_{Constant}$ and $Value_{Constant}$ corresponding to the cell 120c with $Threshold_{Constant}$, the communication device UE1 determines that only $Value_{Constant}$ corresponding to the cell 110c satisfies $Value_{Constant} < Threshold_{Constant}$ in Step 310, which makes the number of the at least one cell reselection rule satisfied by $Value_{Constant}$ corresponding to the cell 110c equal to 1. Subsequently, the communication device UE1 ranks the rule priority of the cell 110c higher than that of the cell 120c in the rule ranking list in Step 312 because the numbers of the at least one cell reselection rule satisfied by $Value_{Constant}$ corresponding to the cells 110c and 120c are 1 and 0, respectively. The communication device UE1 may select the cell 110c to camp on according to the rule ranking list in Step 314.

However, if $Value_{Constant}$ corresponding to the cell 120c is configured as 0.4 and thus satisfies $Value_{Constant} < Threshold_{Constant}$ in Step 310 as well, both the numbers of the at least one cell reselection rule satisfied by $Value_{Constant}$ corresponding to the cells 110c and 120c would be 1. The communication device UE1 may select a cell with better signal quality or signal strength from the cell 110c or 120c to camp on. In another embodiment, the communication device UE1 ranks the cells 110c and 120c according to signal strength or signal quality in order to generate a signal ranking list before checking whether the at least one cell reselection rule is satisfied. If the cell 120c has better signal quality or signal strength than the cell 110c, the communication device UE1 then compares $Value_{Constant}$ corresponding to the cell 120c with $Threshold_{Constant}$. If $Value_{Constant}$ corresponding to the cell 120c is configured as 0.8 and does not satisfy $Value_{Constant} < Threshold_{Constant}$ in Step 310, the communication device UE1 compares $Value_{Constant}$ corresponding to the cell 110c with $Threshold_{Constant}$. In another embodiment, since both the cells 110c and 120c have the highest rule priority in the rule ranking list, the communication device UE1 first selects the cells 110c and 120c as rule candidates from the cells 110c and 120c. The communication device UE1 then ranks the rule candidates according to the frequency priorities (e.g., CellReselectionPriority) of rule candidates in order to generate a frequency ranking list. For example, the frequencies corresponding to the cell 110c and 120c (which serve as the rule candidates) differ, and hence the frequency priority of the cell 120c may be higher than that of the cell 110c. The communication device UE1 would select the cell 120c to camp on according to the frequency ranking list. In another embodiment, the cells 110c and 120c serving as the rule candidates have the same (intra) frequency as the serving cell 100c, meaning that the frequency priorities of the cells 110c and 120c are the same and the highest in the frequency ranking list. In such a situation, the communication device UE1 would select the cells 110c and 120c as frequency candidates, and ranks the frequency candidates according to an R criteria, which is specified in 3GPP standard TS 36.304, signal strength or signal quality in order to generate a signal ranking list. If the cell 110c is ranked as the best cell, the communication device UE1 would tend to camp on the cell 110c according to the signal ranking list. The present invention, nevertheless, is not limited to this, and the communication device UE1 may rank the cells 110c and 120c according to the frequency priorities before it determines whether $Value_{Constant}$ corresponding to the cell 110c or 120c satisfies the at least one cell reselection rule in Step 310. If the frequency priority of the cells 120c is higher than that of the cell 110c, the communication device UE1 would select the cell 120c to camp on without checking whether the at least one cell reselection rule is satisfied. If the rule priorities and the frequency priorities of the cells 110c and 120c are the same, the communication device UE1 then ranks the cells 110c and 120c according to the R criteria to perform cell reselection. Additionally, when the communication device UE1 leaves idle mode (e.g., owing to receiving an RRCConnectionSetupComplete message), it may release the at least one cell reselection rule, the at least one cell reselection value, or the at least one cell reselection threshold.

In short, the communication device UE1 of the present invention would receive second cell reselection information messages broadcasted from the cells 110c and 120c, after the communication device UE1 enters idle mode. Consequently, the communication device UE1 in idle mode can apply the at least one cell reselection value updated to perform cell reselection, which maintain the communication system 10 under the balanced load condition like the one-shot redistribution mechanism specified in 3GPP TSG-RAN WG2 #91 R2-153406.

Please note that the communication system 10 in FIG. 1, the device 20 in FIG. 2 and the process 30 in FIG. 3 are exemplary embodiments of the invention, and those skilled in the art may make alternations and modifications accordingly. For example, the cell reselection information maintenance message may be implemented by a new message distinct from the prior art, and include at least one of at least one cell reselection rule, at least one cell reselection threshold, at least one cell reselection value, a rule validity timer, a threshold validity timer, a value validity timer, a frequency list, an identity of a communication device (e.g., UE ID), a Cell ID, a default frequency, delta values of the at least one cell reselection threshold, and delta values of the at least one cell reselection value. Each of the second cell reselection information messages may include at least one of at least one cell reselection rule, at least one cell reselection threshold, at least one cell reselection value, a rule validity timer, a threshold validity timer, a value validity timer, a PLMN ID, a Cell ID, a neighboring cell list, and a Tracking Area ID. Each of the second cell reselection information messages may be implemented by a new message distinct from the prior art, a Paging message, or a SIB message. The first cell reselection configuration message may include at least one of at least one cell reselection rule, at least one cell reselection threshold, at least one cell reselection value, a rule validity timer, a threshold validity timer, a value validity timer, a frequency list, a public land mobile network (PLMN) ID, a Cell ID, a default frequency, delta values of the at least one cell reselection threshold, delta values of the at least one cell reselection value, and a neighboring cell list. The first cell reselection configuration message may be implemented by a new message distinct from the prior art, an RRCConnectionReconfiguration message, an RRCConnectionRelease message, an RRCConnectionConfiguration message, an RRCConnectionSetup message, a MeasurementControl message, a Paging message, or a System Information block (SIB) message. In this way, the content of the first cell reselection configuration message received by the communication device UE1 can be different from that received by the communication device UE2 if both of the first cell reselection configuration messages are implemented by RRCConnectionRelease messages, while the content of the first cell reselection configuration message received by the communication device UE1 is identical to that received by the communication device UE2 if both of the first cell reselection configuration messages are implemented by SIB messages. That is to say, the at least one cell reselection rule and the at least one cell reselection threshold, and the at least one cell reselection value corresponding to different communication devices (e.g., the communication devices UE1 and UE2) differ.

In addition, $Value_{Capability}$ may be presented as 0 or 1 for supporting or not supporting different features. For example, when the base station 110 supports the MIMO and CA rather than the higher order modulation, $Value_{Capability}$ may be 110—namely, the first "1" is for the MIMO supporting, the second "1" is for the CA supporting, and the last "0" is for the higher order modulation supporting. If $Threshold_{Capability}$ demands 101 in order to ensure the MIMO and higher order modulation support, the capability cell reselection rule, which requires the bit string 110 of $Value_{Capability}$ to be mapping or compared with the bit string 101 of $Threshold_{Capability}$ "bit by bit", is not satisfied. In another example, it is the decimal value (i.e., 7) of the bit string 110 of $\text{Value}_{Capability}$ that is compared with the decimal value (i.e., 5) of the bit string 101 of $\text{Threshold}_{Capability}$. Since 7 is larger than 5, the capability cell reselection rule (i.e., $\text{Value}_{Capability} < \text{Threshold}_{Capability}$) is not satisfied. In such a situation, the most indispensable feature is arranged in the beginning of the bit string, and the most insignificant feature is arranged in the end of the bit string. In another example, the at least one cell reselection rule further includes a MIMO capability cell reselection rule, a CA capability cell reselection rule, and a higher order modulation capability cell reselection rule. Therefore, the binary number 1 of $\text{Value}_{Capability}$ is compared with the binary number 1 of $\text{Value}_{Capability}$ to check whether the MIMO capability cell reselection rule is satisfied; the binary number 1 of $\text{Value}_{Capability}$ is compared with the binary number 0 of $\text{Value}_{Capability}$ to check whether the CA capability cell reselection rule is satisfied; the binary number 0 of $\text{Value}_{Capability}$ is compared with the binary number 1 of $\text{Value}_{Capability}$ to check whether the higher order modulation capability cell reselection rule is satisfied.

Furthermore, when the at least one cell reselection value of the corresponding cell (e.g., one of the cells 100c to 120c) is provided in the corresponding second cell reselection information message broadcasted from the corresponding cell (e.g., in Step 308), the at least one cell reselection value of the corresponding cell may differ from the at least one cell reselection value of the other cells. And the at least one cell reselection value is determined according to the corresponding cell, the corresponding base station or communication devices. In another embodiment, the at least one cell reselection threshold of the corresponding cell (e.g., one of the cells 100c to 120c) instead of the at least one cell reselection value may be provided in the corresponding second cell reselection information message broadcasted from the corresponding cell. In such a situation, the at least one cell reselection threshold of the corresponding cell is defined as the at least one cell reselection value mentioned above according to the corresponding cell, the corresponding base station or communication devices, and may differ from the at least one cell reselection threshold of the corresponding cell of the other cells. It is worth noting that the process 30 is adapted for not only the communication device UE1 but also the communication device UE2.

Figure 4:
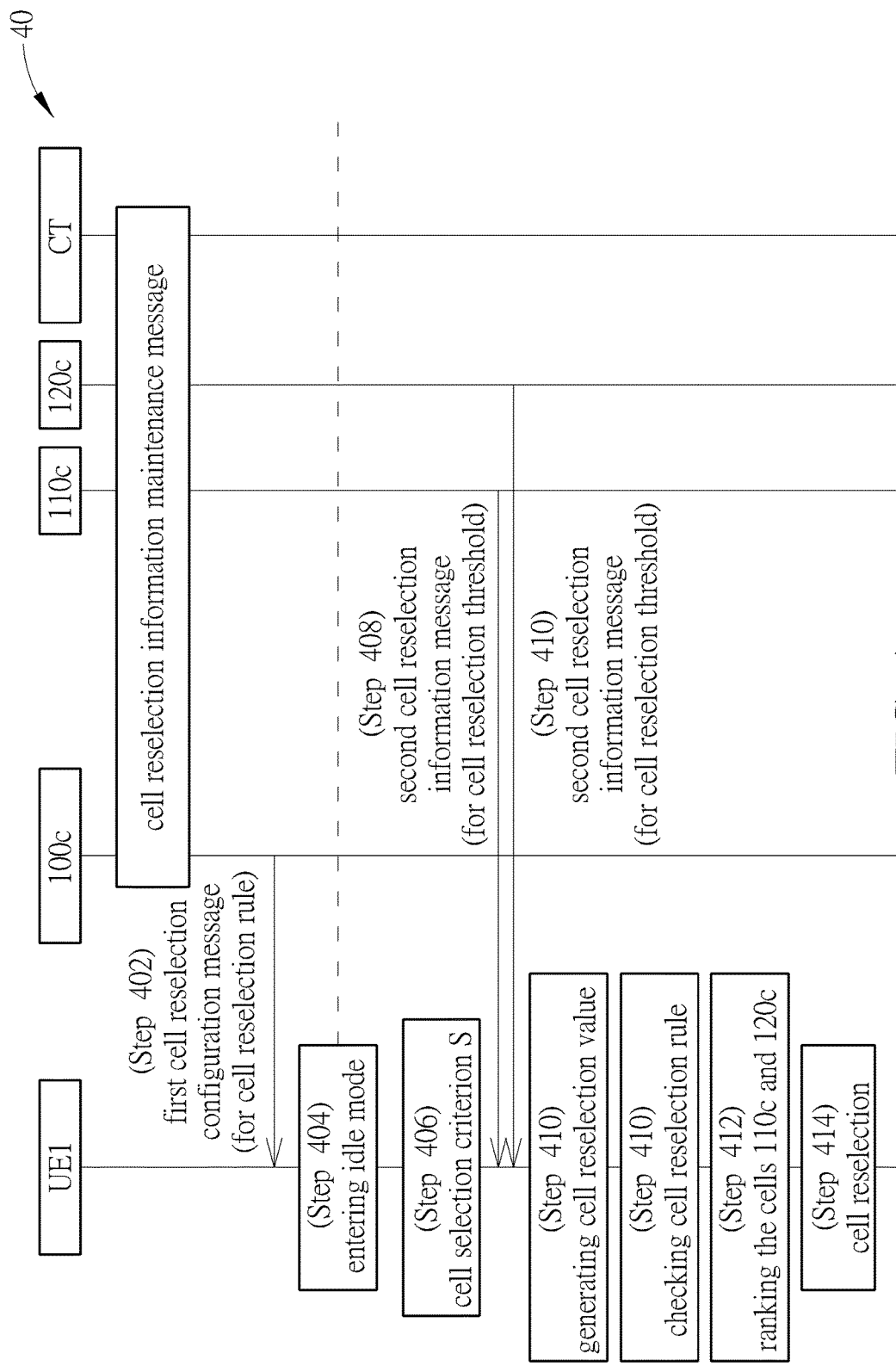

Steps utilized in the communication device UE1 shown in FIG. 1 to handle cell reselection may also vary. For example, FIG. 4 is a flowchart illustrating a process 40 according to an embodiment of the present invention. The process 40 may be compiled into the program code 214 of the communication device UE1 and includes the following steps:

Step 400: Start.

Step 402: Receive a first cell reselection configuration message from the cell 100c, wherein the first cell reselection configuration message includes at least one cell reselection rule, wherein a cell reselection information maintenance message is transmitted between the network nodes to update the at least one cell reselection rule.

Step 404: Enter idle mode.

Step 406: Determine whether the cells 110c and 120c fulfill a cell selection criterion S when the communication device UE1 in idle mode attempts to perform cell reselection.

Step 408: Receive second cell reselection information messages broadcasted from the cells 110c and 120c, wherein each of the second cell reselection information messages includes at least one cell reselection threshold.

Step 410: Check whether the at least one cell reselection rule is satisfied according to the second cell reselection information messages, wherein the communication device UE1 generates at least one cell reselection value randomly, and compares each of the at least one cell reselection threshold corresponding to one of the cells 110c and 120c with the at least one cell reselection value to determine which of the at least one cell reselection rule is satisfied.

Step 412: Rank the cells 110c and 120c according to the number of the at least one cell reselection rule satisfied in order to generate a rule ranking list.

Step 414: Select one of the cells 110c and 120c to camp on according to the rule ranking list, such that cell reselection (to the chosen cell with a highest rule priority in the rule ranking list) can be performed.

Step 416: End.

The structure of the process 40 is similar to that of the process 30—particularly, Steps 404 to 406 are identical to Steps 304 to 306, and Steps 412 to 414 and Steps 312 to 314 are identical. However, unlike the process 30, the base stations 100 to 120 and the controller CT merely interact with each other to determine or update the at least one cell reselection rule (for example, $\text{Value}_{Constant} < \text{Threshold}_{Constant}$) via the cell reselection information maintenance message in Step 402, and hence the first cell reselection configuration message transmitted from the serving cell 100c merely includes the at least one cell reselection rule in Step 402. Instead of the at least one cell reselection value, the second cell reselection information messages broadcasted from its neighbor cells 110c and 120c to the communication device UE1 in idle mode includes the at least one cell reselection threshold (for example, $\text{Threshold}_{Constant}$) in Step 408. According to the second cell reselection information message broadcasted from the cell 110c, $\text{Threshold}_{Constant}$ is configured as, for example, 0.5. According to the second cell reselection information message broadcasted from the cell 120c, $\text{Threshold}_{Constant}$ is configured as, for example, 0.8. The communication device UE1 then generates the at least one cell reselection value randomly in Step 410—for example, $\text{Value}_{Constant}$ equals 0.65. After comparing $\text{Value}_{Constant}$ with $\text{Threshold}_{Constant}$ corresponding to the cell 110c and $\text{Value}_{Constant}$ with $\text{Threshold}_{Constant}$ corresponding to the cell 120c, the communication device UE1 determines that only $\text{Threshold}_{Constant}$ corresponding to the cell 120c satisfies $\text{Value}_{Constant} < \text{Threshold}_{Constant}$ in Step 410. Subsequently, the communication device UE1 may choose the cell 120c to perform cell reselection according to the rule ranking list in Step 414. However, if $\text{Value}_{Constant}$ generated by the communication device UE1 is 0.45, the communication device UE1 may select the cell with better signal strength or signal quality from the cells 110c and 120c.

Figure 5:
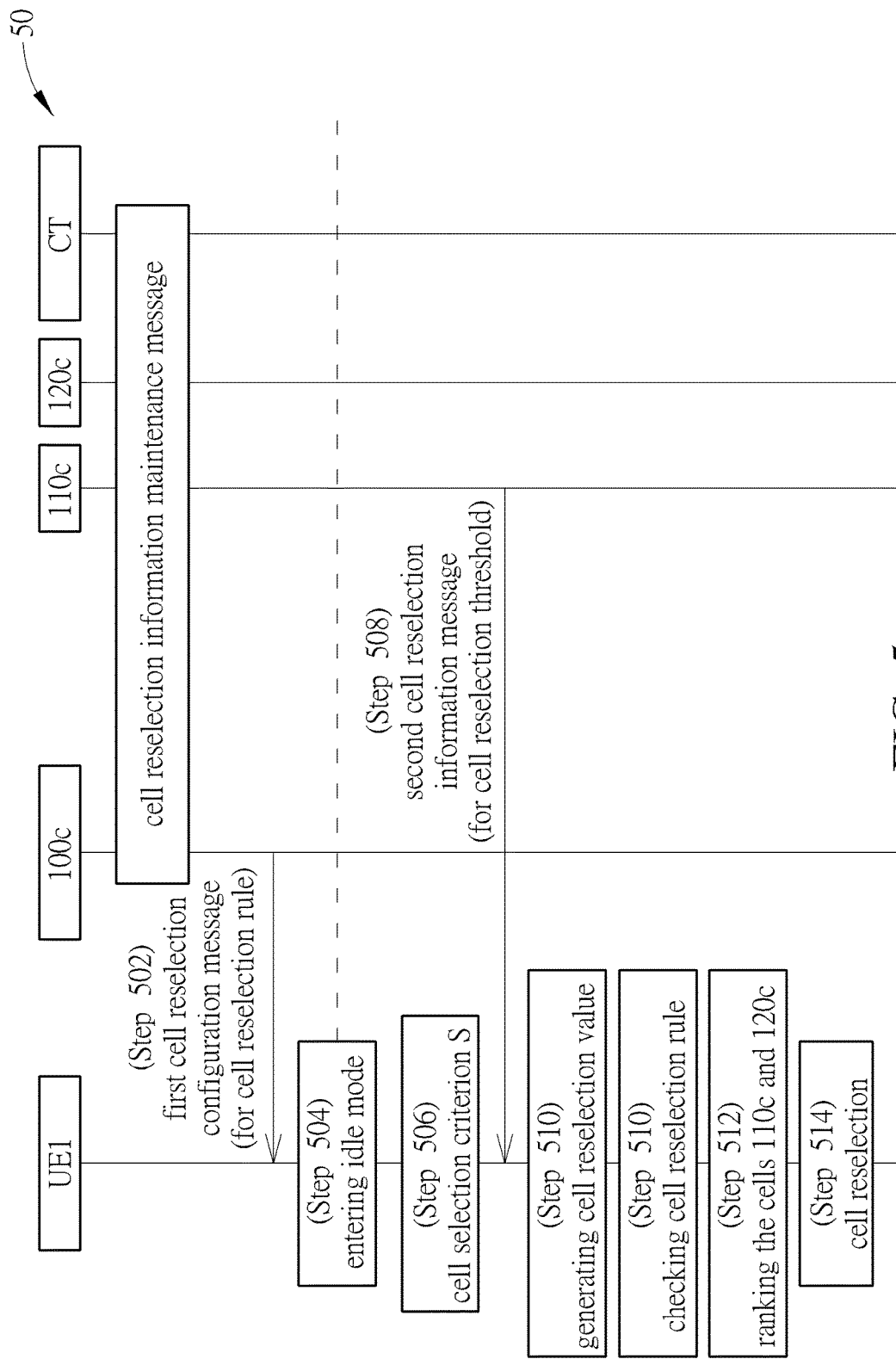

FIG. 5 is a flowchart illustrating a process 50 according to an embodiment of the present invention. The process 50, which is utilized in the communication device UE1 shown in FIG. 1 to handle cell reselection, may be compiled into the program code 214 and includes the following steps:

Step 500: Start.

Step 502: Receive a first cell reselection configuration message from the cell 100c, wherein the first cell reselection configuration message includes at least one cell reselection rule, wherein a cell reselection information maintenance message is transmitted between the network nodes to update the at least one cell reselection rule.

Step 504: Enter idle mode.

Step 506: Determine whether the cells 110c and 120c fulfill a cell selection criterion S when the communication device UE1 in idle mode attempts to perform cell reselection, wherein the cells 110c and 120c are operated on the same frequency, and the signal strength or signal quality of the cell 110c is better than that of the cell 120c.

Step 508: Receive a second cell reselection information message broadcasted from the cell 110c with better signal strength or signal quality, wherein the second cell reselection information message includes at least one cell reselection threshold corresponding to both the cells 110c and 120c.

Step 510: Check whether the at least one cell reselection rule is satisfied according to the second cell reselection information messages, wherein the communication device UE1 generates at least one cell reselection value randomly, and compares each of the at least one cell reselection threshold corresponding to one of the cells 110c and 120c with the at least one cell reselection value to determine which of the at least one cell reselection rule is satisfied.

Step 512: Rank the cells 110c and 120c according to the number of the at least one cell reselection rule satisfied and the signal strength or signal quality of the cells 110c and 120c in order to generate a rule ranking list.

Step 514: Select one of the cells 110c and 120c to camp on according to the rule ranking list, such that cell reselection (to the chosen cell with a highest rule priority in the rule ranking list) can be performed.

Step 516: End.

The structure of the process 50 is similar to that of the process 40—particularly, Steps 502 to 506, 510 and 514 are identical to Steps 402 to 406, 410 and 414. However, unlike the process 40, it is assumed that the cells 110c and 120c are operated on the same frequency, and the signal strength or signal quality of the cell 110c is better than that of the cell 120c. Therefore, the communication device UE1 receives the second cell reselection information message broadcasted merely from the cell 110c with better signal strength or signal quality in Step 508, but the second cell reselection information message would include the at least one cell reselection threshold corresponding to both the neighbor cells 110c and 120c. For example, $Threshold_{Constant}$ corresponding to the cells 110c and 120c is configured as 0.5 and 0.8 respectively. If $Value_{Constant}$ generated by the communication device UE1 randomly in Step 510 equals 0.45, the communication device UE1 at first merely verify whether $Threshold_{Constant}$ corresponding to the cell 110c complies with $Value_{Constant} < Threshold_{Constant}$ because the signal strength or signal quality of the cell 110c is better. Since $Value_{Constant} < Threshold_{Constant}$ is satisfied, the communication device UE1 in Step 514 would choose the cell 110c to perform cell reselection. However, if $Value_{Constant}$ generated by the communication device UE1 randomly in Step 510 is larger than 0.5, the communication device UE1 would then compares $Threshold_{Constant}$ corresponding to the cell 120c of lower signal strength or signal quality with $Value_{Constant}$, since $Threshold_{Constant}$ corresponding to the cell 110c with better signal strength or signal quality fails to comply with $Value_{Constant} < Threshold_{Constant}$. If $Threshold_{Constant}$ corresponding to the cell 120c does not comply with $Value_{Constant} < Threshold_{Constant}$, the communication device UE1 would scan for cells operated on the frequency of lower frequency priority. That is to say, the communication device UE1 selects one of the cells 110c and 120c to camp on not only according to signal strength or signal quality but also according to whether the at least one cell reselection rule is satisfied in Step 512. However, the present invention is not limited to this, and the communication device UE1 receives the second cell reselection information message broadcasted merely from the cell 110c in Step 508 because the frequency priority of the cell 110c is higher than that of the cell 120c. Furthermore, the communication device UE1 may select one of the cells 110c and 120c to camp on according to frequency priority and according to whether the at least one cell reselection rule is satisfied in Step 512.

Figure 6:
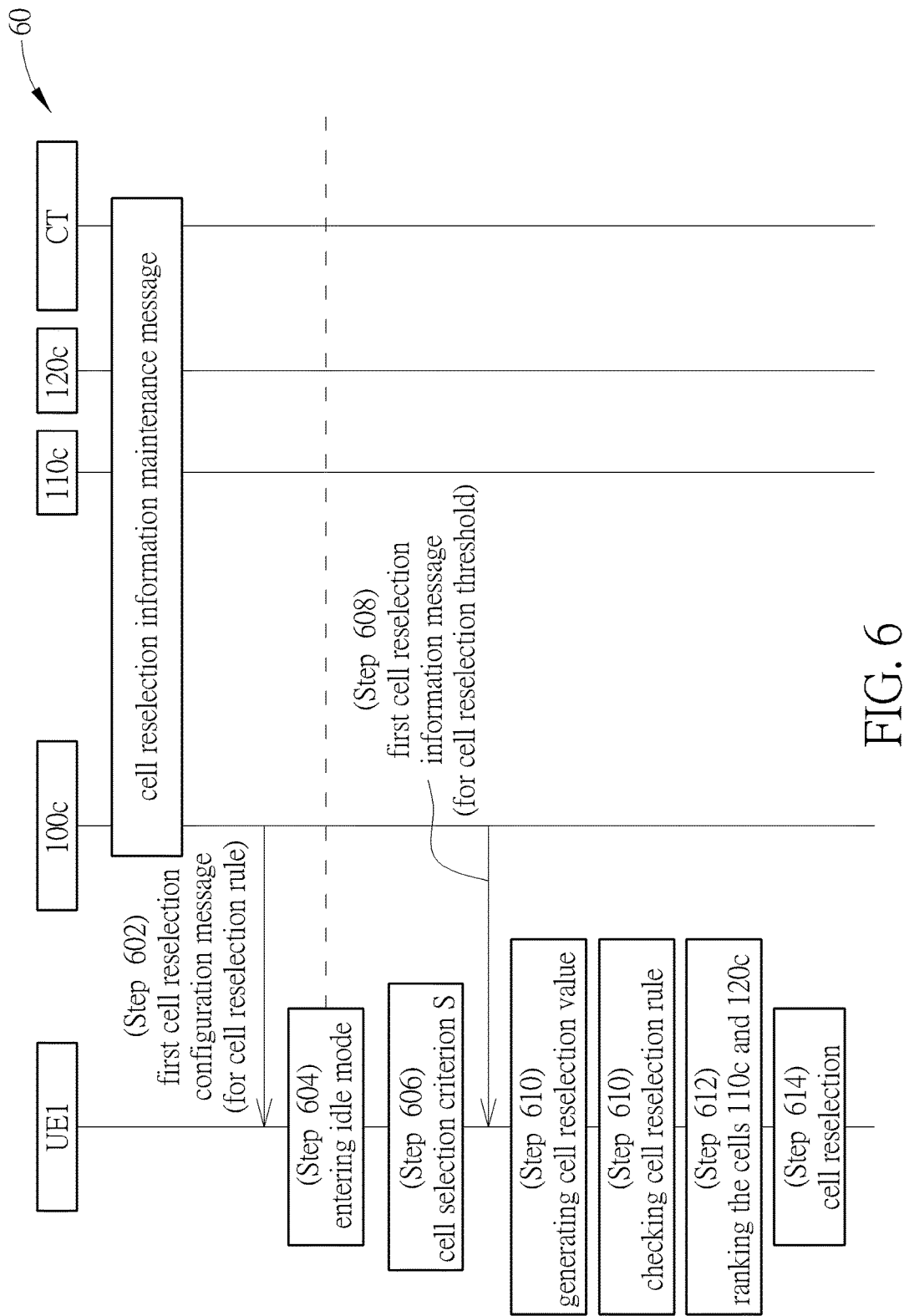

FIG. 6 is a flowchart illustrating a process 60 according to an embodiment of the present invention. The process 60, which is utilized in the communication device UE1 shown in FIG. 1 to handle cell reselection, may be compiled into the program code 214 and includes the following steps:

Step 600: Start.

Step 602: Receive a first cell reselection configuration message from the cell 100c, wherein the first cell reselection configuration message includes the at least one cell reselection rule, wherein a cell reselection information maintenance message is transmitted between the network nodes to update the at least one cell reselection rule.

Step 604: Enter idle mode.

Step 606: Determine whether the cells 110c and 120c fulfill a cell selection criterion S when the communication device UE1 in idle mode attempts to perform cell reselection, wherein the signal strength or signal quality of the cell 110c is better than that of the cell 120c.

Step 608: Receive a first cell reselection information message broadcasted from the cell 100c, wherein the first cell reselection information message includes a neighboring cell list and at least one cell reselection threshold corresponding to both the cells 110c and 120c.

Step 610: Check whether the at least one cell reselection rule is satisfied according to the first cell reselection information messages, wherein the communication device UE1 generates at least one cell reselection value randomly, and compares each of the at least one cell reselection threshold corresponding to one of the cells 110c and 120c with the at least one cell reselection value to determine which of the at least one cell reselection rule is satisfied.

Step 612: Rank the cells 110c and 120c according to the number of the at least one cell reselection rule satisfied and the signal strength or signal quality of the cells 110c and 120c in order to generate a rule ranking list.

Step 614: Select one of the cells 110c and 120c to camp on according to the rule ranking list, such that cell reselection (to the chosen cell with a highest rule priority in the rule ranking list) can be performed.

Step 616: End.

The structure of the process 60 is similar to that of the process 50—particularly, Steps 602 to 606, 612 and 614 are identical to Steps 502 to 506, 512 and 514. However, unlike the process 50, the cells 110c and 120c may not be operated on the same frequency, although the signal strength or signal quality of the cell 110c is still assumed to be better than that of the cell 120c. Moreover, in Step 608, the communication device UE1 in idle mode receives the first cell reselection information message broadcasted from the camped cell 100c, which was the serving cell 100c before the communication device UE1 released to idle mode in Step 604. It is worth noting that the camped cell 100c may be a suitable cell. The first cell reselection information message includes the neighboring cell list, which includes for example the neighbor cells 110c and 120c, and the at least one cell reselection threshold corresponding to both the neighbor cells 110c and 120c. For example, $Threshold_{Constant}$ corresponding to the cells 110c and 120c is configured as 0.5 and 0.8 respectively. If $Value_{Constant}$ generated by the communication device UE1 randomly in Step 610 equals 0.65, the communication device UE1 first verify whether $Threshold_{Constant}$ corresponding to the cell 110c complies with Value$_{Constant}$<Threshold$_{Constant}$ because the signal strength or signal quality of the cell 110c is better. Since Value$_{Constant}$<Threshold$_{Constant}$ is not satisfied, the communication device UE1 is not allowed to camp on the cell 110c. The communication device UE1 would then compare Threshold$_{Constant}$ corresponding to the cell 120c of lower signal strength or signal quality with Value$_{Constant}$. If Threshold$_{Constant}$ corresponding to the cell 120c does not comply with Value$_{Constant}$<Threshold$_{Constant}$, the communication device UE1 would scan for other cells, which are operated on the frequency of lower frequency priority and fulfill the cell selection criterion S. In another embodiment, the neighboring cell list and the at least one cell reselection threshold corresponding to the cells 110c and 120c is sent in the first cell reselection configuration message from the serving cell 100c to the communication device UE1 in Step 602; for this reason, the first cell reselection information message broadcasted in Step 608 may be omitted. In another embodiment, the first cell reselection information message or the first cell reselection configuration message includes at least one of the neighboring cell list, the at least one cell reselection rule corresponding to the neighbor cells 110c and 120c, the at least one cell reselection threshold corresponding to the neighbor cells 110c and 120c, and the at least one cell reselection value corresponding to the neighbor cells 110c and 120c.

Figure 7:
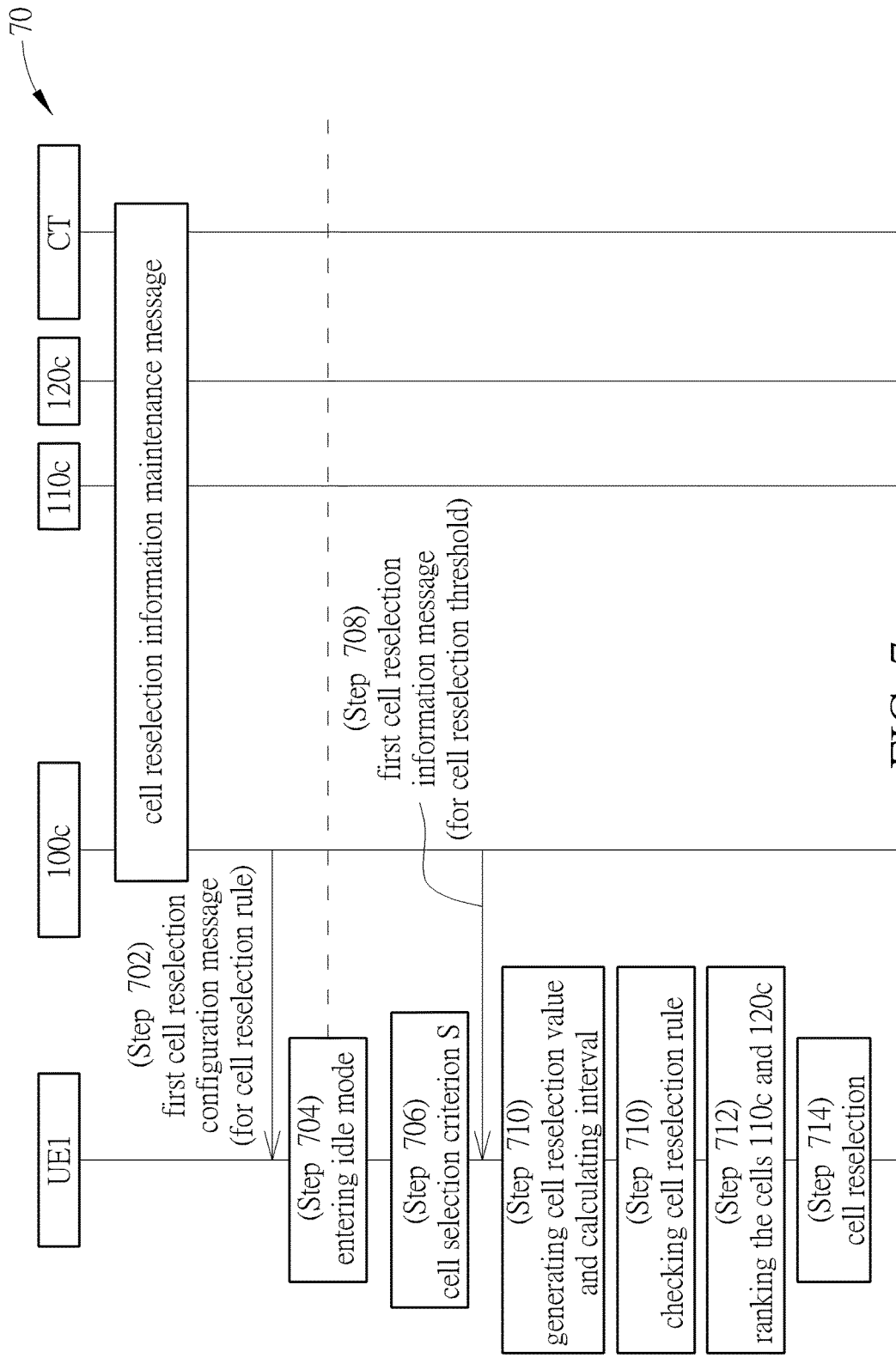

FIG. 7 is a flowchart illustrating a process 70 according to an embodiment of the present invention. The process 70, which is utilized in the communication device UE1 shown in FIG. 1 to handle cell reselection, may be compiled into the program code 214 and includes the following steps:

Step 700: Start.

Step 702: Receive a first cell reselection configuration message from the cell 100c, wherein the first cell reselection configuration message includes the at least one cell reselection rule, wherein a cell reselection information maintenance message is transmitted between the network nodes to update the at least one cell reselection rule.

Step 704: Enter idle mode.

Step 706: Determine whether the cells 110c and 120c fulfill a cell selection criterion S when the communication device UE1 in idle mode attempts to perform cell reselection.

Step 708: Receive a first cell reselection information message broadcasted from the cell 100c, wherein the first cell reselection information message includes a neighboring cell list and at least one cell reselection threshold corresponding to both the cells 110c and 120c.

Step 710: Check whether the at least one cell reselection rule is satisfied according to the first cell reselection information messages, wherein the communication device UE1 generates at least one cell reselection value randomly, calculates intervals corresponding to the cells 110c and 120c according to the at least one cell reselection threshold, and determines which interval the at least one cell reselection value is bounded in, wherein the communication device UE1 compares each of the at least one cell reselection threshold corresponding to one of the cells 110c and 120c with the at least one cell reselection value to determine which of the at least one cell reselection rule is satisfied.

Step 712: Rank the cells 110c and 120c according to the number of the at least one cell reselection rule satisfied in order to generate a rule ranking list.

Step 714: Select one of the cells 110c and 120c to camp on according to the rule ranking list, such that cell reselection (to the chosen cell with a highest rule priority in the rule ranking list) can be performed.

Step 716: End.

The structure of the process 70 is similar to that of the process 60—particularly, Steps 702 to 708 and 714 are identical to Steps 602 to 608 and 614. However, unlike the process 60, the signal strength or signal quality of the cells 110c and 120c is not that critical. And the main difference between the processes 60 and 70 is that the communication device UE1 would calculate intervals corresponding to the cells 110c and 120c according to the at least one cell reselection threshold and determines which interval the at least one cell reselection value is bounded in. For example, Threshold$_{Constant}$ corresponding to the cells 110c and 120c is configured as 0.2 and 0.3 respectively, and both the neighbor cells 110c and 120c fulfill a cell selection criterion S. The communication device UE1 first normalizes Threshold$_{Constant}$ corresponding to the cells 110c and 120c. Here the normalize Threshold$_{Constant}$ corresponding to the cells 110c and 120c becomes $$\frac{0.2}{0.2+0.3} = 0.4 \text{ and } \frac{0.3}{0.2+0.3} = 0.6$$

respectively, which means Threshold$_{Constant}$ can be presented as a probability. The communication device UE1 then determines intervals corresponding to the cells 110c and 120c to be (0, 0.4] and (0.4, 1] respectively according to the normalize Threshold$_{Constant}$ in Step 710, which means Threshold$_{Constant}$ can be presented as an interval such as "from 0 to 0.4" and "from 0.4 to 1". If Value$_{Constant}$ generated by the communication device UE1 randomly in Step 710 is larger than 0.4, the communication device UE1 would choose the cell 120c to perform cell reselection in Step 714 because Value$_{Constant}$ falls within the interval (0.4, 1]. In another embodiment, the neighboring cell list and the at least one cell reselection threshold corresponding to the cells 110c and 120c is sent in the first cell reselection configuration message from the serving cell 100c to the communication device UE1 in Step 702; for this reason, the first cell reselection information message broadcasted in Step 708 may be omitted. In another embodiment, after the communication device UE1 generates at least one cell reselection value randomly in step 610, the communication device UE1 may calculate intervals corresponding to the cells 110c and 120c according to the at least one cell reselection threshold as in step 710 to determine which of the at least one cell reselection rule is satisfied.

On the other hand, the communication device UE1 may find that no cell satisfies any of the at least one cell reselection rule in Steps 310, 410, 510, 610, or 710—namely, neither the cell 110c or the cell 120c satisfies any of the at least one cell reselection rule. To prevent the communication device UE1 from having no cell to camp on, the communication device UE1 selects one of the cells 110c and 120c to camp on according to a default frequency instead of executing Steps 312 to 314, 412 to 414, 512 to 514, 612 to 614, or 712 to 714 when none of the at least one cell reselection rule is satisfied by the cell 110c or 120c. Similarly, in another embodiment, the communication device UE1 selects one of the cells 110c and 120c to camp on according to the frequency priorities of the cells 110c and 120c when none of the at least one cell reselection rule is satisfied by the cell 110c or 120c and when the cells 110c and 120c are operated on the default frequency.

Figure 8:
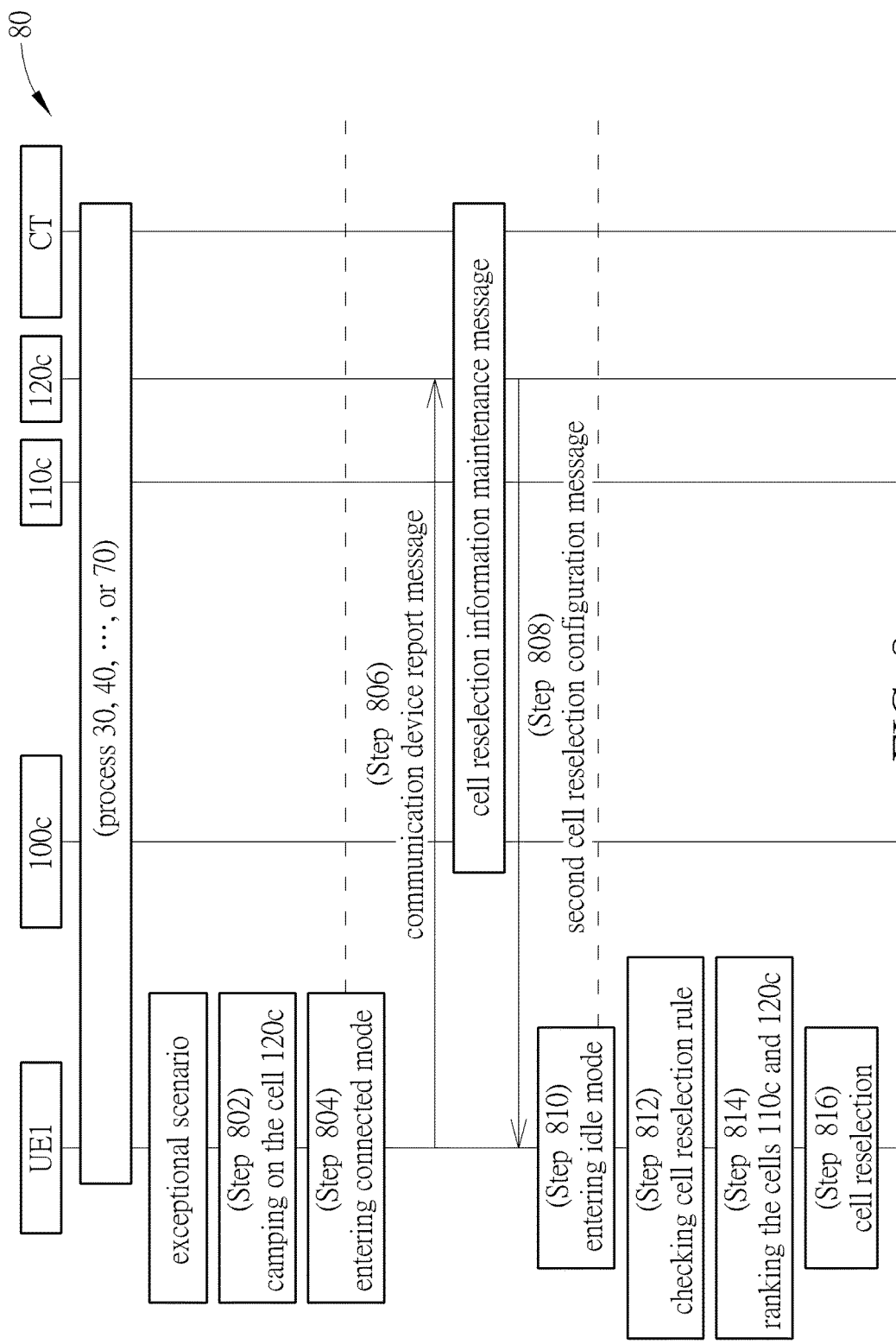

Normally, the communication device UE1 performs cell reselection as the aforementioned processes 30 to 70. However, the communication device UE1 may encounter an exceptional scenario when the communication device UE1 is not capable of performing cell reselection according to a frequency list, at least one cell reselection rule or a default frequency, when the at least one cell reselection threshold or the at least one cell reselection value received by the communication device UE1 does not match the at least one cell reselection rule stored in the communication device UE1, or when a rule validity timer of the at least one cell reselection rule, a threshold validity timer of the at least one cell reselection threshold or a value validity timer of the at least one cell reselection value is expired. The rule validity timer, the threshold validity timer or the value validity timer is activated when the communication device UE1 receives the rule validity timer, the threshold validity timer or the value validity timer, but not limited thereto. To solve this problem, FIG. 8 is a flowchart illustrating a process 80 according to an embodiment of the present invention. The process 80, which is utilized in the communication device UE1 shown in FIG. 1 to handle cell reselection, may be compiled into the program code 214 and includes the following steps:

Step 800: Start.

Step 802: Select, for example, the cell 120c from the cells 100c to 120c to camp on according to the default frequency or the frequency list when the exceptional scenario occurs.

Step 804: Enter connected mode.

Step 806: Transmit a communication device report message to the cell 120c in order to make the at least one cell reselection rule, the at least one cell reselection threshold or the at least one cell reselection value adjusted by the network nodes, wherein the communication device report message includes cell information stored in the communication device UE1.

Step 808: Receive a second cell reselection configuration message corresponding to the communication device report message from the cell 120c to update at least one cell reselection rule, at least one cell reselection threshold or at least one cell reselection value, wherein a cell reselection information maintenance message is transmitted between the network nodes to update the at least one cell reselection rule, the at least one cell reselection threshold or the at least one cell reselection value.

Step 810: Enter idle mode.

Step 812: Check whether the at least one cell reselection rule is satisfied according to the second cell reselection configuration message.

Step 814: Rank the cells 100c and 120c according to the number of the at least one cell reselection rule satisfied in order to generate a rule ranking list.

Step 816: Select one of the cells 100c and 120c to camp on according to the rule ranking list, such that cell reselection (to the chosen cell with a highest rule priority in the rule ranking list) can be performed.

Step 818: End.

Namely, when the exceptional scenario occurs, the communication device UE1 selects the cell 120c from the cells 100c to 120c to camp on according to the default frequency or the frequency list received in the first cell reselection configuration message, the first cell reselection information message or the second cell reselection information messages in Step 802 without checking whether the at least one cell reselection rule is satisfied. The RRC connection establishment such as an establishment cause may be trigger, and the communication device UE1 may enter connected mode in Step 804. The communication device UE1 then transmits the communication device report message to the cell 120c in Step 806. The communication device report message includes cell information stored in the communication device UE1 such as a blacklist or a cell ID plus frequency. The blacklist and the cell ID plus frequency may correspond to the cell that the communication device UE1 cannot camp on because the at least one cell reselection rule are not satisfied. Furthermore, The communication device report message may also include at least one of an indicator of exceptional scenario, a UE ID, an establishment cause, at least one cell reselection rule, at least one cell reselection threshold, at least one cell reselection value, a rule validity timer, a threshold validity timer, a value validity timer, and a frequency list, and may be implemented by a new message distinct from the prior art, a MeasurementReport message, an RRCConnectionRequest message, or an RRCConnectionSetupComplete message.

After the cell 120c receives the communication device report message, the base stations 100 to 120 and the controller CT interact with each other to determine or update the at least one cell reselection rule, the at least one cell reselection threshold and the at least one cell reselection value via the cell reselection information maintenance message in Step 808. For example, the base station 120 instructs the controller CT to adjust the at least one cell reselection rule, the at least one cell reselection threshold and the at least one cell reselection value. The controller CT transmits the at least one cell reselection rule, the at least one cell reselection threshold and the at least one cell reselection value to the base stations 100 and 110. The base stations 100 and 110 then updates the at least one cell reselection rule, the at least one cell reselection threshold and the at least one cell reselection value. According to Step 808, the cell 120c responds to the communication device UE1 with the second cell reselection configuration message, such that the communication device UE1 can update the at least one cell reselection rule, the at least one cell reselection threshold or the at least one cell reselection value reassigned. The communication device UE1 then enters idle mode, and checks whether the at least one cell reselection rule is satisfied in order to find a cell to camp on in Steps 812 to 816. The mechanism of Steps 812 to 816 is similar to that of the Steps 310 to 314, and the similar parts are not detailed redundantly. Additionally, the communication device UE1 may release the blacklist such as the cell ID plus frequency when the communication device UE1 reselects a cell successfully, when the communication device UE1 enters connected mode, or when the rule validity timer, the threshold validity timer, or the value validity timer expires.

Figure 9:
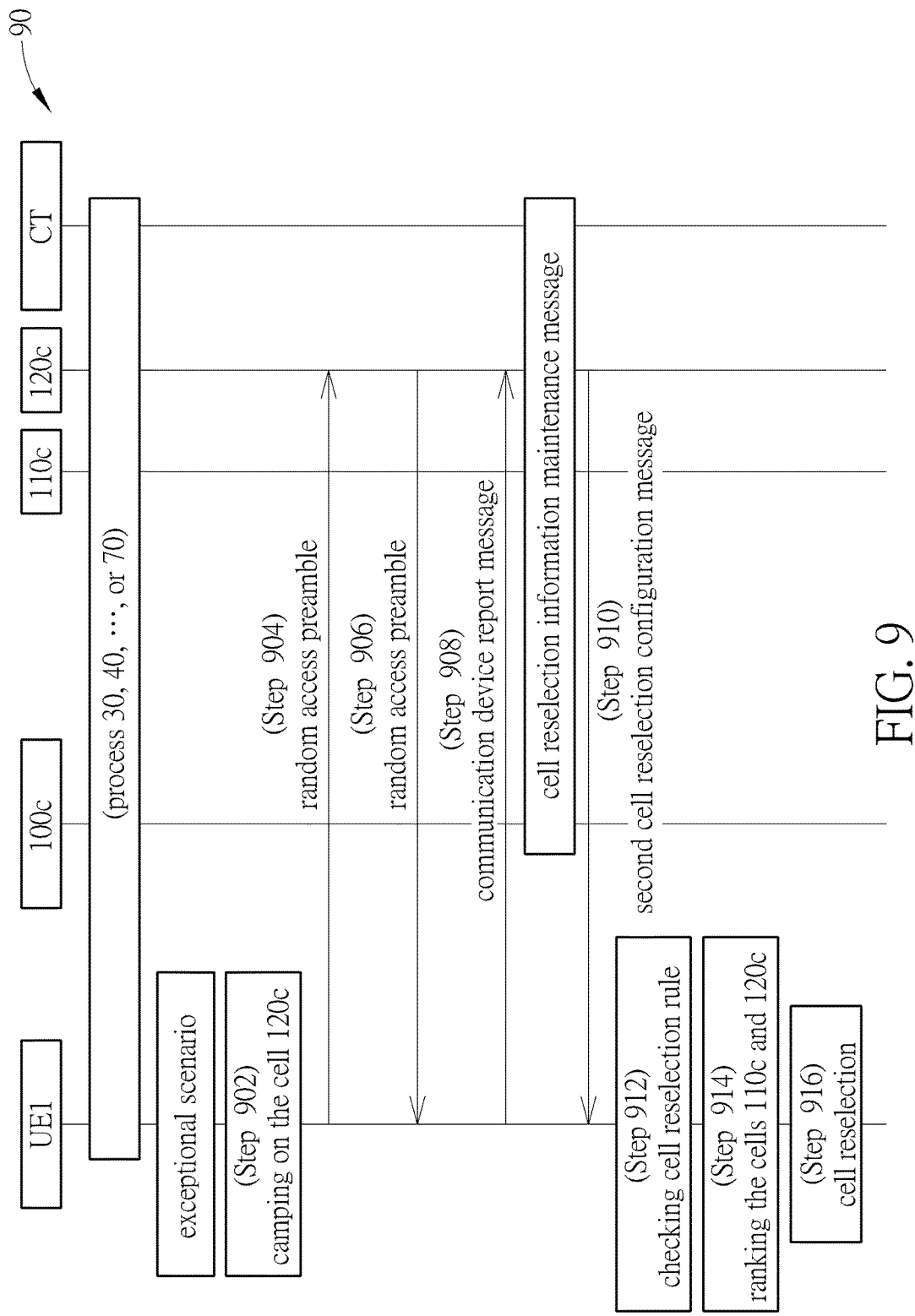

FIG. 9 is a flowchart illustrating a process 90 according to an embodiment of the present invention. The process 90, which is utilized in the communication device UE1 shown in FIG. 1 to handle cell reselection, may be compiled into the program code 214 and includes the following steps:

Step 900: Start.

Step 902: Select, for example, the cell 120c from the cells 100c to 120c to camp on according to the default frequency without entering connected mode when the exceptional scenario occurs.

Step 904: Transmit a random access preamble to the cell 120c.

Step 906: Receive a random access response from the cell 120c.

Step 908: Transmit a communication device report message to the cell 120c in order to make the at least one cell reselection rule, the at least one cell reselection threshold or the at least one cell reselection value adjusted by the network nodes, wherein the communication device report message includes cell information stored in the communication device UE1.

Step 910: Receive a second cell reselection configuration message corresponding to the communication device report message from the cell 120c to update at least one cell reselection rule, at least one cell reselection threshold or at least one cell reselection value, wherein a cell reselection information maintenance message is transmitted between the network nodes to update the at least one cell reselection rule, the at least one cell reselection threshold or the at least one cell reselection value.

Step 912: Check whether the at least one cell reselection rule is satisfied according to the second cell reselection configuration message.

Step 914: Rank the cells 100c and 120c according to the number of the at least one cell reselection rule satisfied in order to generate a rule ranking list.

Step 916: Select one of the cells 100c and 120c to camp on according to the rule ranking list, such that cell reselection (to the chosen cell with a highest rule priority in the rule ranking list) can be performed.

Step 918: End.

The structure of the process 90 is similar to that of the process 80—particularly, Steps 908 to 910 are identical to Steps 806 to 808, and Steps 912 to 916 and Steps 812 to 816 are identical. However, unlike the process 80, the communication device UE1 does not enter connected mode when camping on the cell 120c in Step 902. And after the communication device UE1 transmits the random access preamble to the cell 120c, it waits for the random access response in return.

Figure 10:
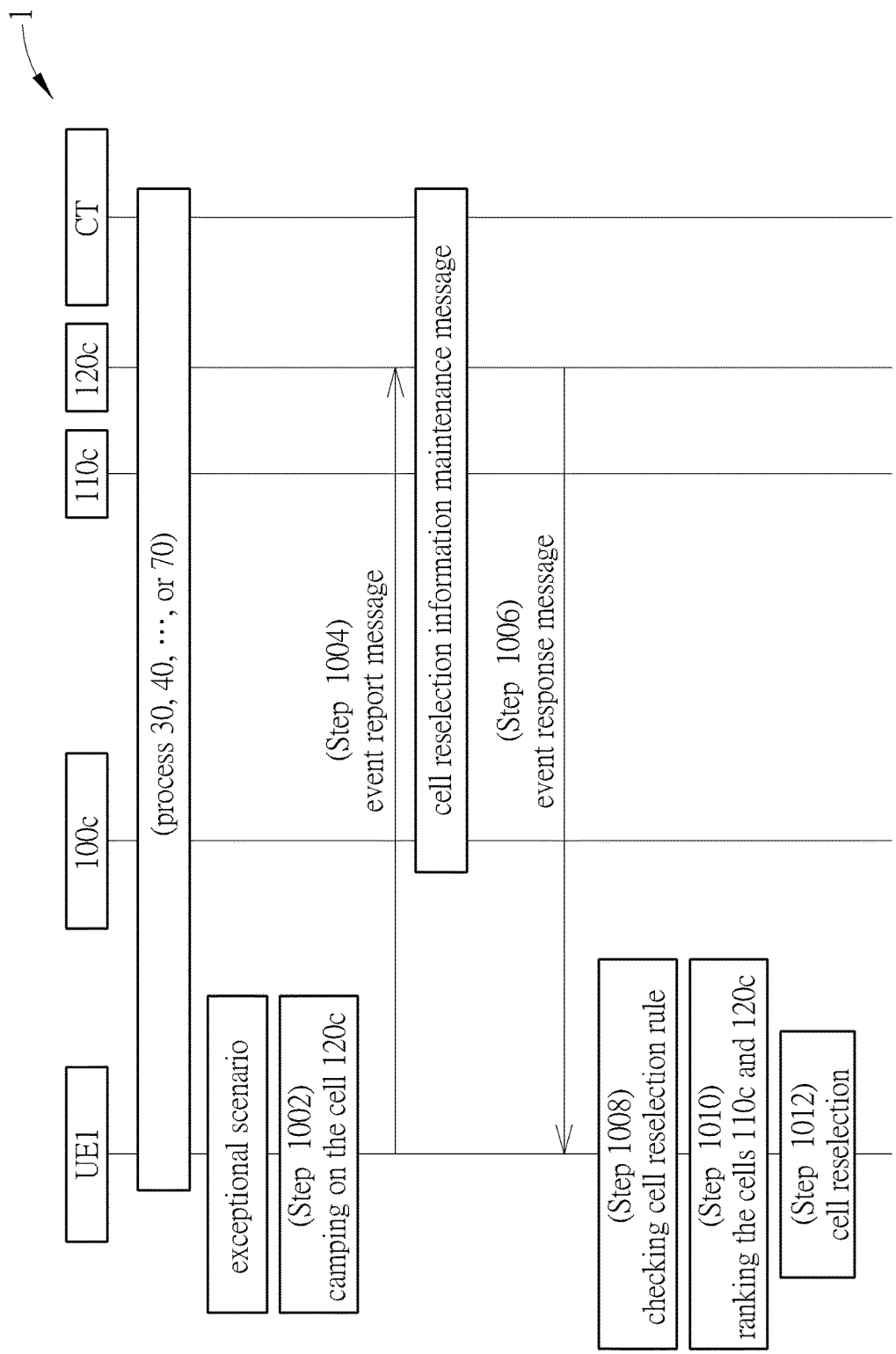

FIG. 10 is a flowchart illustrating a process 1 according to an embodiment of the present invention. The process 1, which is utilized in the communication device UE1 shown in FIG. 1 to handle cell reselection, may be compiled into the program code 214 and includes the following steps:

Step 1000: Start.

Step 1002: Select, for example, the cell 120c from the cells 100c to 120c to camp on according to the default frequency without entering connected mode when the exceptional scenario occurs.

Step 1004: Transmit an event report message to the cell 120c in order to make the at least one cell reselection rule, the at least one cell reselection threshold or the at least one cell reselection value adjusted by the network nodes, wherein the event report message is configured to indicate the communication device UE1 has no cell to camp on.

Step 1006: Receive an event response message corresponding to the event report message from the cell 120c to update at least one cell reselection rule, at least one cell reselection threshold or at least one cell reselection value, wherein a cell reselection information maintenance message is transmitted between the network nodes to update the at least one cell reselection rule, the at least one cell reselection threshold or the at least one cell reselection value.

Step 1008: Check whether the at least one cell reselection rule is satisfied according to the second cell reselection configuration message.

Step 1010: Rank the cells 100c and 120c according to the number of the at least one cell reselection rule satisfied in order to generate a rule ranking list.

Step 1012: Select one of the cells 100c and 120c to camp on according to the rule ranking list, such that cell reselection (to the chosen cell with a highest rule priority in the rule ranking list) can be performed.

Step 1014: End.

The structure of the process 1 is similar to that of the process 80—particularly, Steps 1008 to 1012 and Steps 812 to 816 are identical. However, unlike the process 80, the communication device UE1 does not enter connected mode when camping on the cell 120c in Step 1002. And the communication device UE1 transmits the event report message to the cell 120c in Step 1004. The event report message is configured to inform the cell 120c that the communication device UE1 has no cell to camp on, and may include at least one of an indicator of exceptional scenario, an indicator of the communication device UE1 camping on, a UE ID, a Cell ID, and at least one cell reselection rule. The event report message is implemented by a new message distinct from the prior art; alternatively, the event report message may be implemented by a random access preamble as Step 904 to notify the base stations 100 to 120 and the controller CT that the communication device UE1 has camped on the cell 120c. In this way, the base stations 100 to 120 and the controller CT may know the distribution of communication devices (e.g., the communication devices UE1 and UE2) in idle mode, and the base stations 100 to 120 and the controller CT interact with each other not only to update the at least one cell reselection rule, the at least one cell reselection threshold and the at least one cell reselection value but also to balance the distribution of communication devices in idle mode. Later, the cell 120c responds to the communication device UE1 with the event response message in step 1006, such that the communication device UE1 can update the at least one cell reselection rule, the at least one cell reselection threshold or the at least one cell reselection value reassigned. The event response message may be implemented by a new message distinct from the prior art or a random access response as Step 906, and may include at least one of at least one cell reselection rule, at least one cell reselection threshold, at least one cell reselection value, a rule validity timer, a threshold validity timer, a value validity timer, a default frequency, delta values of the at least one cell reselection threshold, and delta values of the at least one cell reselection value.

Figure 11:
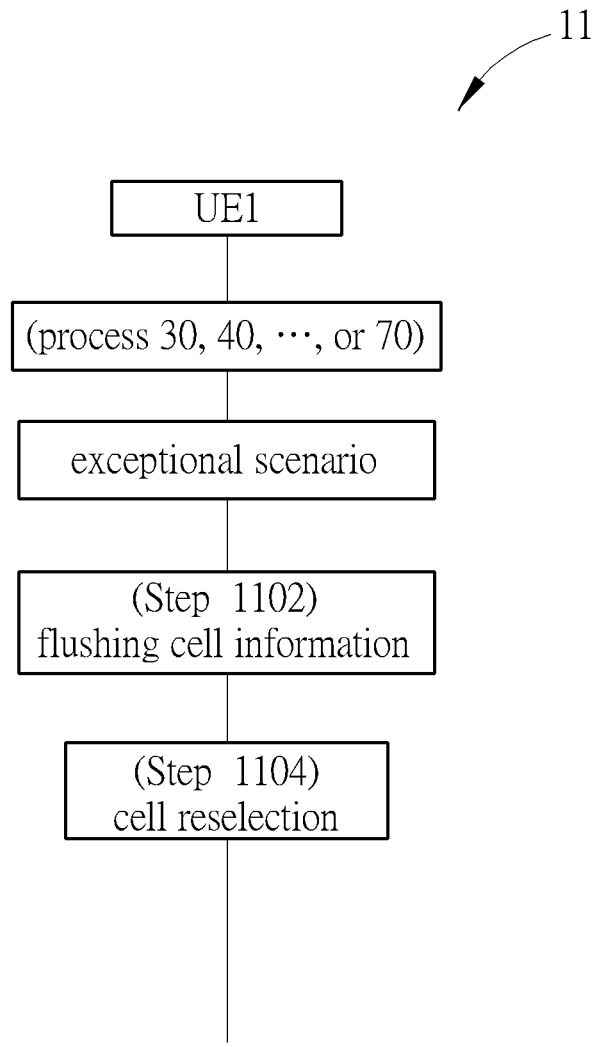

FIG. 11 is a flowchart illustrating a process 11 according to an embodiment of the present invention. The process 11, which is utilized in the communication device UE1 shown in FIG. 1 to handle cell reselection, may be compiled into the program code 214 and includes the following steps:

Step 1100: Start.

Step 1102: Flush cell information stored in the communication device UE1 when the exceptional scenario occurs.

Step 1104: Perform cell reselection according to the frequency list.

Step 1106: End.

When the exceptional scenario occurs, the communication device UE1 may flush the cell information stored in it according to Step 1102. The cell information stored in the communication device UE1 may include a blacklist or a cell ID plus frequency. In an embodiment, the communication device UE1 in step 1104 performs cell reselection according to the frequency list and the at least one cell reselection rule. In another embodiment, the communication device UE1 in step 1104 performs cell reselection according to the frequency list but ignores the at least one cell reselection rule. Particularly, the communication device UE1 may ignore the at least one cell reselection rule when at least one cell reselection value or at least one cell reselection threshold corresponding to the at least one cell reselection rule has not been obtained from the network nodes yet or is not applicable to the at least one cell reselection rule, causing that the at least one cell reselection rule cannot be satisfied.

In the prior art, communication devices in connected mode tend to gather at the frequency with the highest frequency priority. Even network nodes handover some of the communication devices in connected mode toward frequency with the lower frequency priority, the communication devices released to idle mode would return to the frequency with the highest frequency priority when the communication devices in idle mode reconnects. And the network nodes cannot change the frequency list or the frequency priorities stored in the communication devices in idle mode before the communication devices enter connected mode. The action of load balancing thus becomes a burden on the network nodes.

By comparison, a communication device of the present invention would receive a first cell reselection information message broadcasted from its camped cell or second cell reselection information messages broadcasted from neighbor cells after the communication device enters idle mode. Together with a first cell reselection configuration message transmitted from the serving cell (i.e., the camped cell) of the communication device in connected mode, the communication device can determine whether at least one cell reselection rule is satisfied to choose a cell for cell reselection. Since the contents of the first cell reselection configuration message, the first cell reselection information message, and the second cell reselection information messages are frequently or regularly updated, the distribution of communication devices can be preserved, redistributed or even equalized to achieve load balancing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling cell reselection, adapted to a communication device of a communication system, comprising:
    receiving a first cell reselection information message from a cell of the communication system, wherein the first cell reselection information message comprises at least one cell reselection threshold;
    generating a rule ranking list, further comprising:
        selecting a best cell according to a given criteria for each of a plurality of frequencies; and
        storing the best cell into the rule ranking list if the best cell is corresponding with the cell reselection threshold; and
    selecting one of the best cells for cell reselection according to the rule ranking list, further comprising:
        calculating a plurality of intervals each corresponding to one of the best cells within the rule ranking list according to the cell reselection threshold;
        generating a cell reselection value; and
        determining which of the plurality of intervals the cell reselection value is bounded in in order to determine which one of the best cells for cell reselection.

2. The method of claim 1, wherein the step of selecting the best cell according to the given criteria for each of the plurality of frequencies is performed according to a frequency priority.

3. A communication device, comprising:
    a storage unit, configured to store a program code; and
    a processing unit, configured to execute the program code, wherein a method of handling cell reselection compiled into the program code comprises:
        receiving a first cell reselection information message from a cell of the communication system, wherein the first cell reselection information message comprises at least one cell reselection threshold;
        generating a rule ranking list, further comprising:
            selecting a best cell according to a given criteria for each of a plurality of frequencies; and
            storing the best cell into the rule ranking list if the best cell is corresponding with the cell reselection threshold; and
        selecting one of the best cells for cell reselection according to the rule ranking list, further comprising:
            calculating a plurality of intervals each corresponding to one of the best cells within the rule ranking list according to the cell reselection threshold;
            generating a cell reselection value; and
            determining which of the plurality of intervals the cell reselection value is bounded in in order to determine which one of the best cells for cell reselection.

4. The communication device of claim 3, wherein the step of selecting the best cell according to the given criteria for each of the plurality of frequencies is performed according to a frequency priority.

* * * * *